US011675709B2

(12) United States Patent
D'Eliseo et al.

(10) Patent No.: US 11,675,709 B2
(45) Date of Patent: Jun. 13, 2023

(54) READING SEQUENTIAL DATA FROM MEMORY USING A PIVOT TABLE

(71) Applicant: Micron Technology, Inc., Boise, ID (US)

(72) Inventors: Giuseppe D'Eliseo, Caserta (IT); Carminantonio Manganelli, San Giorgio del Sannio (IT); Paolo Papa, Naples (IT); Yoav Weinberg, Thornhill (CA); Giuseppe Ferrari, Naples (IT); Massimo Iaculo, San Marco Evangelista (IT); Lalla Fatima Drissi, Ottaviano (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/494,740

(22) Filed: Oct. 5, 2021

(65) Prior Publication Data

US 2022/0027284 A1 Jan. 27, 2022

Related U.S. Application Data

(63) Continuation of application No. 16/713,552, filed on Dec. 13, 2019, now Pat. No. 11,151,052.

(51) Int. Cl.
*G06F 12/1009* (2016.01)

(52) U.S. Cl.
CPC .... *G06F 12/1009* (2013.01); *G06F 2212/657* (2013.01)

(58) Field of Classification Search
CPC ....................... G06F 12/1009; G06F 2212/657
See application file for complete search history.

(56) References Cited

U.S. PATENT DOCUMENTS

| | | | | |
|---|---|---|---|---|
| 8,756,382 | B1 * | 6/2014 | Carlson | G06F 3/064 711/170 |
| 11,151,052 | B2 | 10/2021 | D'eliseo et al. | |
| 2008/0201521 | A1 * | 8/2008 | Mizoguchi | G06F 13/4243 711/E12.001 |
| 2011/0208898 | A1 ‡ | 8/2011 | Shin | G06F 12/0246 711/E12.008 |

(Continued)

OTHER PUBLICATIONS

Reading Sequential Data from Memory Using a Pivot Table, U.S. Appl. No. 16/713,552, filed Dec. 13, 2019, Giuseppe D'Eliseo et al., Patented Case, Mar. 12, 2021.

*Primary Examiner* — Sean D Rossiter
(74) *Attorney, Agent, or Firm* — Greenberg Traurig

(57) ABSTRACT

In one approach, a computer storage device has one or more pivot tables and corresponding bit maps stored in volatile memory. The storage device has non-volatile storage media that stores data for a host device. The pivot tables and bit maps are used to determine physical addresses of the non-volatile storage media for logical addresses received in commands from the host device that are determined to be within a sequential address range (e.g., LBAs that are part of a prior sequential write operation by the host device). When a command is received by the storage device that includes a logical address within the sequential address range, then one of the pivot tables and its corresponding bit map are used to determine the physical address of the non-volatile storage media that corresponds to the logical address.

21 Claims, 7 Drawing Sheets

(56) References Cited

U.S. PATENT DOCUMENTS

| | | | | |
|---|---|---|---|---|
| 2019/0220416 | A1* | 7/2019 | Jung | G06F 12/1009 |
| 2019/0236021 | A1* | 8/2019 | Lai | G06F 12/1009 |
| 2019/0294376 | A1* | 9/2019 | Park | G06F 3/0679 |
| 2021/0182207 | A1 | 6/2021 | D'eliseo et al. | |

* cited by examiner
‡ imported from a related application

Logical-to-Physical Mapping 201

| Index (LBA) | Value (Physical Address) |
|---|---|
| 0 | xyz |
| ... | |
| 7 | 1000 |
| 8 | 1001 |
| 9 | 1002 |
| 10 | 1003 |
| ... | ... |
| 97 | 1090 |
| ... | ... |
| 1023 | hijk |

Sequential Range 202 (LBA 7 to 97)

FIG. 2

Pivot Table 302

| Pivot Index | Value (Starting Physical Address) |
|---|---|
| 0 | 1000-7 = 993 |
| 1 | abcd |
| 2 | xyzw |
| ... | ... |

FIG. 3

Bit Map 402

| Bit Index | Bit Value |
|---|---|
| 0 | 0 |
| 1 | 0 |
| 2 | 0 |
| ... | ... |
| 6 | 0 |
| 7 | 1 |
| 8 | 1 |
| 9 | 1 |
| 10 | 1 |
| ... | ... |
| 97 | 1 |
| 98 | 0 |
| 99 | 0 |
| ... | ... |
| 126 | 0 |
| 127 | 0 |

FIG. 4

| Pivot Index | Corresponding Chunk (PPT) Index (LBA) | LBA Range Covered by the Pivot | LBA Range Covered by each 16 Bytes (=128 bits) of Bit Map (BPT) |
|---|---|---|---|
| 0 | 0 (PPT #0) | 0…127 (PPT #0) | 0…127 (PPT #0) |
| 1 | 128 (PPT #0) | 128…255 (PPT #0) | 128…255 (PPT #0) |
| 2 | 256 (PPT #0) | 256 … 511 (PPT #0) | 256 … 511 (PPT #0) |
| … | … | … | … |
| 7 | 896 (PPT #0) | 896 … 1023 (PPT #0) | 896 … 1023 (PPT #0) |
| 8 | 1024 (PPT #1) | 1024…1151 (PPT #1) | 1024…1151 (PPT #1) |
| 9 | 1152 (PPT #1) | 1152…1279 (PPT #1) | 1152…1279 (PPT #1) |
| … | … | … | … |

FIG. 5

Logical-to-Physical Chunk 601

| LBA (Index) | Physical Address |
|---|---|
| 0 | Pointer to LBA0 |
| 1 | Pointer to LBA1 |
| 2 | Pointer to LBA2 |
| ... | ... |
| 127 | Pointer to LBA127 |
| 128 | Pointer to LBA128 |
| ... | ... |
| 255 | Pointer to LBA255 |
| 256 | Pointer to LBA256 |
| ... | ... |
| 896 | Pointer to LBA896 |
| ... | ... |
| 1022 | Pointer to LBA1022 |
| 1023 | Pointer to LBA1023 |

FIG. 6

Pivot Table 701

| Pivot Index | Starting Physical Address |
|---|---|
| 0 | Sequential Pointer to LBA0 |
| 1 | Sequential Pointer to LBA128 |
| 2 | Sequential Pointer to LBA256 |
| ... | ... |
| 7 | Sequential Pointer to LBA896 |

FIG. 7

Bit Map 801

| Bit Map Index | Bit Value |
|---|---|
| 0 | 00000001 11111111 11111111 ... 00000000 |
| 1 | 11111111 11111111 11111111 ... 11111111 |
| 2 | ... |
| ... | ... |
| 7 | 00000000 00000000 11111111 ... 00000000 |

FIG. 8

READING SEQUENTIAL DATA FROM MEMORY USING A PIVOT TABLE

RELATED APPLICATIONS

The present application is a continuation application of U.S. patent application Ser. No. 16/713,552 filed Dec. 13, 2019, issued as U.S. Pat. No. 11,151,052 on Oct. 19, 2021, the entire disclosure of which application is hereby incorporated herein by reference.

FIELD OF THE TECHNOLOGY

At least some embodiments disclosed herein relate to computer storage devices in general and more particularly, but not limited to using a pivot table to read data stored in a non-volatile storage device.

BACKGROUND

Various types of non-volatile storage devices can be used to store data. Non-volatile storage devices can include NAND flash memory devices.

Typical computer storage devices have controllers that receive data access requests from host computers and perform programmed computing tasks to implement the requests in ways that may be specific to the media and structure configured in the storage devices. In one example, a flash memory controller manages data stored in flash memory and communicates with a computer device.

In some cases, flash memory controllers are used in SD cards or similar media for use in digital cameras, mobile phones, etc. In other cases, USB flash drives use flash memory controllers to communicate through a USB port with a computer.

Firmware can be used to operate a flash memory controller for a particular storage device. In one example, when a computer system or device reads data from or writes data to a flash memory device, it communicates with the flash memory controller.

Typically, a flash memory controller includes a flash translation layer (FTL) that maps logical block addresses (LBAs) received from a host device to physical addresses of flash memory. By doing so, the FTL provides a logical-to-physical mapping.

In some cases, storage devices are managed NAND devices that include a memory controller and support interfaces such as eMMC and SD. Also, universal flash storage (UFS) is a flash storage specification for digital cameras, mobile phones, etc. UFS is viewed as a replacement for eMMC and SD cards.

BRIEF DESCRIPTION OF THE DRAWINGS

The embodiments are illustrated by way of example and not limitation in the figures of the accompanying drawings in which like references indicate similar elements.

FIG. 2 illustrates a logical-to-physical mapping for a storage device, in accordance with some embodiments.

FIG. 3 illustrates a pivot table, in accordance with some embodiments.

FIG. 4 illustrates a bit map, in accordance with some embodiments.

FIG. 5 illustrates a logical correspondence between logical block addresses, pivot tables, and bit maps, in accordance with some embodiments.

FIG. 6 illustrates a logical-to-physical chunk that includes logical block addresses and corresponding physical addresses, in accordance with some embodiments.

FIG. 7 illustrates a pivot table including starting physical addresses that correspond to logical block addresses in the logical-to-physical chunk of FIG. 6, in accordance with some embodiments.

FIG. 8 illustrates a bit map including bits that correspond to the logical block addresses in the logical-to-physical chunk of FIG. 6, in accordance with some embodiments.

DETAILED DESCRIPTION

Figure 1:
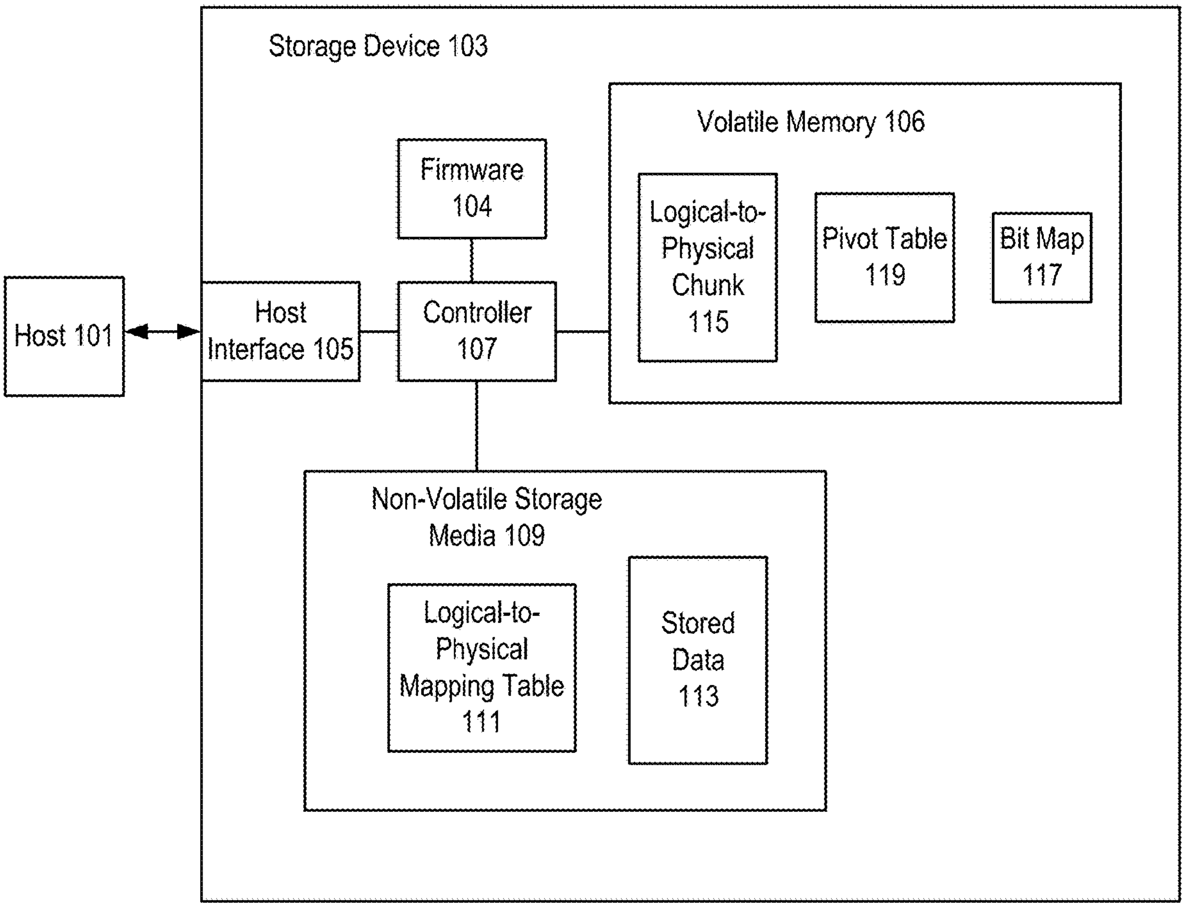
FIG. 1 illustrates a storage device including volatile memory that stores a pivot table and a bit map, in accordance with some embodiments.

At least some embodiments herein relate to determining physical addresses for a memory unit of a storage device based on logical addresses (e.g., LBAs) in commands received by the storage device from a host device (e.g., a mobile phone or other computing device that is reading data stored in the storage device).

Physical memory elements of a storage device can be arranged as logical memory blocks addressed via logical block addressing (LBA). A logical memory block is the smallest LBA addressable memory unit, and each LBA address identifies a single logical memory block that can be mapped to a particular physical address of a memory unit in the storage device.

Controllers typically use a logical-to-physical mapping table to determine the physical addresses based on the logical addresses in the commands received from the host device. The mapping table typically requires a large amount of memory storage. In cases in which the storage device has limited volatile memory (e.g., SRAM) storage capacity (e.g., UFS or eMMC devices), most of the mapping table must be stored in non-volatile memory (e.g., NAND flash) of the storage device.

The limited size of the volatile memory creates a technical problem. Specifically, when a command is received, a new portion of the mapping table (e.g., sometimes referred to as a chunk of the mapping table) must be loaded from the non-volatile memory to the volatile memory in order for the controller to perform the logical-to-physical translation. This significantly slows the performance of the storage device. For example, the read access time is significantly increased due to the need to load the chunk into the volatile memory.

Various embodiments of the present disclosure provide a technological solution to the above technical problem. In some embodiments, one or more pivot tables and corresponding bit maps are stored in volatile memory and used to determine physical addresses for logical addresses that are within a sequential range (e.g., LBAs that are part of a prior sequential write operation by the host device). When a command is received by a storage device that includes a logical address that is within the sequential range, then a pivot table and its corresponding bit map are used to determine the physical address that corresponds to the logical address. This determination is performed without needing to load a new chunk to volatile memory from a logical-to-physical mapping table that is stored in non-volatile memory of the storage device. In one example, a sequential range is a set of consecutive LBA addresses.

In one embodiment, a method for a storage device (e.g., a USB drive) comprises: receiving, by a controller, a command including a first logical address (e.g., LBA 10) for data stored in non-volatile storage media (e.g., NAND flash); determining, by the controller based on a first stored value (e.g., a bit value of 1 in a bit map in volatile memory) that corresponds to the first logical address, whether the first logical address is in a sequential range (e.g., data written in non-volatile memory in a logical sequence from LBA 7 to LBA 97); and in response to determining that the first logical address is in the sequential range, determining a first physical address (e.g., 1003) that corresponds to the first logical address.

Determining the first physical address is performed by determining a displacement from a starting physical address (e.g., a starting physical address with a value of 993 that corresponds to LBA 0, and is stored in a pivot table in volatile memory) associated with the sequential range. The displacement is determined by a difference between the first logical address and a second logical address (e.g., LBA 0) that corresponds to the starting physical address. The first physical address is determined by adding the displacement (e.g., the logical address of LBA 10 minus the logical address of LBA 0, which is a displacement of 10−0=10) to the starting physical address (e.g., 993+10=1003, which is the physical address that corresponds to LBA 10).

In another example of the method above, the host device sends a sequential write command from LBA 150 to LBA 200 (51 logical addresses) that are allocated from NAND physical addresses 2000 to 2050. A starting physical address (pivot index 1) is determined as 2000−(150−128)=1978. In this calculation, 150 is the value of the logical address for the first LBA address in the sequential range. 2000 is the value of the physical address that corresponds to the first LBA address. 128 is the value of the LBA address that corresponds to the start of the LBA range (e.g., LBA 128 to LBA 255 as illustrated in FIG. 5 below) covered by the pivot table using corresponding pivot index item 1. In one example, pivot index item 1 is the starting physical address given by Sequential Pointer to LBA 128 as illustrated in pivot table 701 of FIG. 7 below.

If a read command from the host device is received with an LBA=165, the controller first determines that the bit corresponding to LBA=165 in the bit map has a value of 1. This indicates that the pivot table can be used to determine the physical address instead of loading a chunk from non-volatile memory. The physical address that corresponds to LBA=165 is calculated using the starting physical address of 1978 (pivot index 1) that is stored in the pivot table. The controller determines the physical address for LBA=165 as follows: 1978+(165−128)=1978+37=2015.

In one embodiment, for a random read operation in which an LBA is received, the controller determines whether a logical-to-physical chunk that corresponds to the received LBA has previously been loaded in RAM. If the chunk is not loaded, before issuing a chunk load command, the controller checks the bit in the bit map that corresponds to the received LBA. If this bit is set to high (e.g., the bit has a value of 1), the controller can determine the physical address that corresponds to the received LBA using the pivot table, as described above.

In one embodiment, the bit map is a logical-to-logical table. Each LBA in the logical address space of the host corresponds to a respective bit in the bit map. Each bit has a value that indicates whether data corresponding to the LBA is written sequentially relative to the nearest previous pivot physical position. For example, if the bit has a value of 1, then the data corresponding to the LBA is determined to be sequentially written.

In one embodiment, the pivot table is updated after determining a sequence of consecutive addresses within a range of addresses. If the range of addresses includes more than one sequence, then the pivot table is updated based on the longest sequence in the range. Specifically, the starting physical address and the pivot table that corresponds to the range of addresses is updated based on the determination of the longest sequence in the range.

The bit map is also updated. Specifically, each bit of the bit map that corresponds to an LBA that is within the determined longest sequence is set high (e.g., bit value=1). The other bits of the bit map are set low (e.g., bit value=0).

In light of the above, using a pivot table and bit map to determine physical addresses for sequential logical addresses can provide various advantages. In one example, in a flash translation layer with low RAM resources, using the pivot table and bit map avoids the need to load a logical-to-physical chunk into SRAM from NAND for logical-to-physical translation and thus improves random read performances.

In another example, system benchmarks in which a sequential write phase is followed by a random write phase plus a random read phase, or a sequential write phase followed by a random read phase, are improved. In one example, the use of the pivot table and bit map uses a relatively small amount of data stored in SRAM to calculate the required physical address of a page during random read accesses by a host device.

FIG. 1 illustrates a storage device 103 including volatile memory 106 that stores a pivot table 119 and a bit map 117, in accordance with some embodiments. In FIG. 1, a host (101) communicates with storage device (103) via a communication channel having a predetermined protocol. The host (101) can be a computer (e.g., mobile phone or other computing device) having one or more central processing units (CPUs) to which computer peripheral devices, such as the storage device (103), may be attached via an interconnect, such as a computer bus.

The computer storage device (103) can be used to store data for the host (101). Examples of computer storage devices in general include flash memory, etc. The storage device (103) has a host interface (105) that implements communications with the host (101) using the communication channel. For example, the communication channel between the host (101) and the storage device (103) is a bus in one embodiment; and the host (101) and the storage device (103) communicate with each other using the eMMC or UFS protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using various data storage management and usage commands.

The storage device (103) has a controller (107) that runs firmware (104) to perform operations responsive to the communications from the host (101). Firmware in general is a type of computer program that provides control, monitoring, and data manipulation of engineered computing devices. In FIG. 1, the firmware (104) controls the operations of the controller (107) in operating the storage device (103), such as translating a logical address to a physical address for storing and accessing data in the storage device (103). In one example, the controller is an internal controller of a managed NAND device that stores data in TLC NAND flash memory.

The storage device (103) has non-volatile storage media (109), such as memory cells in an integrated circuit. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile random-access memory (RAM) (106). In one embodiment, a portion of the RAM is used for the storage of run-time data and instructions used by the controller (107) to improve the computation performance of the controller (107) and/or provide buffers for data transferred between the host (101) and the non-volatile storage media (109). RAM (106) is volatile in that it requires power to maintain the data/information stored therein, which data/information is lost immediately or rapidly when the power is interrupted.

Volatile memory (106) typically has less latency than non-volatile storage media (109), but loses its data quickly when power is removed. Thus, in some cases, it is advantageous to use the volatile memory (106) to temporarily store instructions and/or data used for the controller (107) in its current computing task to improve performance. In some instances, the volatile memory (106) is implemented using volatile static random-access memory (SRAM) that uses less power than DRAM in some applications.

During operation, controller 107 receives various commands from host 101. These commands can include a read command or a write command. In one example, a read command includes a logical address, and is received from host 101 to access stored data 113 in non-volatile storage media 109.

In addition to stored data 113, non-volatile storage media 109 stores a logical-to-physical mapping table 111. Mapping table 111 stores a physical address corresponding to each logical address for the data storage capacity of non-volatile storage media 109.

In addition to pivot table 119 and bit map 117, volatile memory 106 stores a logical-to-physical chunk 115. Chunk 115 is a portion of mapping table 111 that is loaded into volatile memory 106 by controller 107. Chunk 115 is used by controller 107 to determine a physical address for the logical address received in the read command from host 101.

In some cases, when the read command is received, controller 107 determines that chunk 115 has previously been loaded into volatile memory 106 and can be used to determine a physical address for the received logical address (e.g., the received logical address falls within the LBA range of chunk 115). In other cases, controller 107 determines that chunk 115 cannot be used to determine the corresponding physical address for the received logical address (e.g., the received logical address is outside of the LBA range of chunk 115).

In cases in which a previously-loaded chunk 115 cannot be used to determine the corresponding physical address, controller 107 uses bit map 117 as described above to determine whether the received logical address is in a sequential range (e.g., the data has been previously written in a sequence in non-volatile storage media 109). If the received logical address is in a sequential range, controller 107 determines the physical address using pivot table 119 as described herein. The physical address that is determined is used to read that portion of stored data 113 that corresponds to the received logical address. Controller 107 then sends the read data to host 101.

If the received logical address is not in a sequential range as determined by bit map 117, then controller 107 loads a new chunk 115 into volatile memory 106 from mapping table 111. The physical address is determined using the new chunk 115. In one embodiment, when the new chunk 115 is loaded, pivot table 119 and/or bit map 117 are updated.

In some instances, the controller (107) has multiple processors, each having its own in-processor cache memory. Optionally, the controller (107) performs data intensive, in-memory processing using data and/or instructions organized in the storage device (103). For example, in response to a request from the host (101), the controller (107) performs a real-time analysis of a set of data stored in the storage device (103) and communicates a reduced data set to the host (101) as a response. For example, in some applications, the storage device (103) is connected to real-time sensors to store sensor inputs (e.g., sensors of an autonomous vehicle or digital camera); and the processors of the controller (107) are configured to perform machine learning and/or pattern recognition based on the sensor inputs to support an artificial intelligence (AI) system that is implemented at least in part via the storage device (103) and/or the host (101).

The storage device (103) can be used in various computing systems, such as a cloud computing system, an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the disclosures herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile memory (106) and/or the in-processor cache memory for execution by the controller (107).

The firmware (104) can be configured to use the techniques discussed below that use a pivot table and bit map. However, the techniques discussed below are not limited to being used in the computer system of FIG. 1 and/or the examples discussed above.

A non-transitory computer storage medium can be used to store instructions of the firmware (104). When the instructions are executed by the controller (107) of the computer storage device (103), the instructions cause the controller (107) or other processing device(s) to perform a method discussed herein.

In one example, the non-volatile storage media (109) of the storage device (103) has memory units that may be identified by a range of LBA addresses, where the range corresponds to a memory capacity of the non-volatile storage media (109).

In one embodiment, a local manager (not shown) of storage device 103 receives data access commands. A data access request (e.g., read, write) from the host 101 identifies an LBA address to read, write, or erase data from a memory unit identified by the LBA address. The local manager translates the logical address to a physical address.

In one embodiment, a controller is implemented by one or more processing devices. In one embodiment, a computer system includes a first memory device (e.g., SRAM) and a second memory device (e.g., NAND flash), and one or more processing devices (e.g., a CPU or system on a chip (SoC)). In one embodiment, the computer system can include a processing device and a controller.

The processing device can be, for example, a microprocessor, a central processing unit (CPU), a processing core of a processor, an execution unit, etc. In some instances, the controller can be referred to as a memory controller, a memory management unit, and/or an initiator. In one example, the controller controls the communications over a bus coupled between the computer system and one or more memory sub-systems.

The controller of the computer system can communicate with a controller of the memory sub-system to perform operations such as reading data, writing data, or erasing data at memory components and other such operations. In some instances, the controller is integrated within the same package of the processing device. In other instances, the controller is separate from the package of the processing device. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

FIG. 2 illustrates a logical-to-physical mapping 201 for a storage device, in accordance with some embodiments. In one example, the storage device is storage device 103 of FIG. 1. Mapping 201 includes values for LBA addresses and values for corresponding physical addresses stored in non-volatile memory. In one example, the physical addresses are physical addresses of stored data 113 in non-volatile storage media 109 of FIG. 1.

The LBA addresses of logical-to-physical mapping 201 include a sequential range 202 of logical addresses. For example, logical addresses LBA 7 to LBA 97 are in sequential range 202. Logical addresses LBA 7 to LBA 97 correspond to physical addresses 1000 to 1090. In one example, a host sends a sequential write command from LBA 7 to LBA 97 (91 logical addresses) that are allocated from NAND physical addresses 1000 to 1090.

FIG. 3 illustrates a pivot table 302, in accordance with some embodiments. Pivot table 302 is an example of pivot table 119 of FIG. 1. Pivot table 302 includes various starting physical addresses. In one example, each starting physical address corresponds to a pivot index 0, 1, 2, . . . . In one example, controller 107 uses a starting physical address obtained from pivot table 302 when calculating a physical address for a received logical address. In one example, each pivot index corresponds to a range of LBA addresses. The starting physical address selected by controller 107 corresponds to the pivot index for the particular range of LBA addresses in which a received LBA address is within. For example, the starting physical address for pivot index 1 corresponds to an LBA range of 128-255, and is used when a logical address for LBA 150 is received.

FIG. 4 illustrates a bit map 402, in accordance with some embodiments. Bit map 402 is an example of bit map 117 of FIG. 1. Bit map 402 includes bit values that correspond to a bit index 0, 1, 2, . . . , 127. In one example, bit map 402 corresponds to a range of logical addresses from LBA 0 to LBA 127. Each bit value indicates whether the corresponding LBA address is within a sequential range. For example, bit values for bit index 7 to 97 are set high to 1, which indicates that LBA 7 to LBA 97 are within sequential range 202. Bit values for the other LBA addresses within the range LBA 0 to LBA 127 are set low to 0, which indicates that the other LBA addresses are outside of sequential range 202.

FIG. 5 illustrates a logical correspondence between logical block addresses (LBAs), pivot tables, and bit maps, in accordance with some embodiments. In one example, a range of LBAs from LBA 0 to LBA 127 corresponds to pivot index 0 of pivot table 302 of FIG. 3. The range of LBAs from LBA 0 to LBA 127 also respectively corresponds to bit index 0 to 127 of bit map 402 of FIG. 4.

In one example, a range of LBAs from LBA 128 to LBA 255 corresponds to pivot index 1 of pivot table 302 of FIG. 3, and further corresponds to bit index 128 to 255 (not shown) of bit map 402.

In one example, a range of LBAs from LBA 0 to LBA 1023 corresponds to a first chunk (indicated as PPT #0) and a first pivot table (pivot 0). A range of LBAs from LBA 1024 to LBA 2047 corresponds to a second chunk (indicated as PPT #1) and a second pivot table (pivot 1). The first chunk and the second chunk are each an example of logical-to-physical chunk 115 of FIG. 1.

FIG. 6 illustrates a logical-to-physical chunk 601 that includes logical block addresses (LBAs) and corresponding physical addresses, in accordance with some embodiments. Logical-to-physical chunk 601 is an example of logical-to-physical chunk 115 of FIG. 1. In FIG. 6, chunk 601 provides physical addresses for a logical address range of LBA 0 to LBA 1023. In one example, a Pointer to LBA 0 as illustrated is the corresponding physical address for logic address LBA 0. Other corresponding physical addresses are similarly provided for the other LBAs.

In one example, chunk 601 has a size of 4 KB and can address 4 MB of data. The number of pointers in chunk 601 is 1,024. The size of each item in chunk 601 is 4 bytes (4B).

FIG. 7 illustrates a pivot table 701 including starting physical addresses that correspond to logical block addresses in the logical-to-physical chunk 601 of FIG. 6, in accordance with some embodiments. Pivot table 701 is an example of pivot table 119 of FIG. 1. In FIG. 7, pivot table 701 provides a starting physical address for each of various corresponding ranges of logical addresses. In one example, the starting physical address for pivot index 0 corresponds to a first logical address range from LBA 0 to LBA 127. In one example, the starting physical address for the first logical address range is a sequential pointer to LBA 0.

In another example, the starting physical address for pivot index 1 corresponds to a second logical address range from LBA 128 to LBA 255. The starting physical address for the second logical address range is a sequential pointer to LBA 128.

In one example, the starting physical addresses (pivot index 0 to 7) of pivot table 701 cover the entire logical address range of chunk 601 (a first chunk) of LBA 0 to LBA 1023. As mentioned above, in one example, a range of LBAs from LBA 1024 to LBA 2047 corresponds to a second chunk (not shown) and a second pivot table (not shown). In other embodiments, instead of multiple pivot tables, a single pivot table can be used.

In one example, pivot table 701 has a size of 32 bytes. The number of items in pivot table 701 is eight. The size of each item is 4 bytes. Each logical-to-physical chunk corresponds to a respective pivot table.

FIG. 8 illustrates a bit map 801 including bits that correspond to the logical block addresses in the logical-to-physical chunk 601 of FIG. 6, in accordance with some embodiments. Bit map 801 is an example of bit map 117 of FIG. 1. In FIG. 8, bit map 801 stores a bit for each of a range of logical addresses. In one example, each item of the bit map 801 corresponds to an array of bits indexed by bit map index 0, 1, 2, . . . , 7. For example, the bit array for bit map index 0 corresponds to logical address range LBA 0 to LBA 127. For each LBA address in this range, the bit array includes a single bit that is set high or low depending on whether the corresponding LBA address is in a sequential range, as described above.

In one example, the bit map 801 includes a plurality of bit arrays (each indexed by bit map index 0, 1, 2, . . . , 7). Each bit array includes a portion of the bits stored in bit map 801. Each bit array corresponds to a respective starting physical address of the pivot table 701. In one example, the bit array for bit map index 0 corresponds to the sequential pointer to LBA 0. In another example, the bit array for bit map index 7 corresponds to the sequential pointer to LBA 896.

In one example, bit map 801 has a size of 128 bytes and covers the range of LBA 0 to LBA 1023. Each bit array (bit map index 0, 1, . . . , 7) has a size of 16 bytes (16B).

In other embodiments, the sizes and ranges of chunk 601, pivot table 701, and/or bit map 801 (and/or the bit arrays in bit map 801) can vary to be larger and/or smaller. The above embodiments and examples are merely exemplary and not limiting.

In one embodiment, pivot table 701 and/or bitmap 801 are updated in response to loading a logical-to-physical chunk into volatile memory 106. In one example, when a chunk is loaded, one or more bit arrays of bit map 801 are updated.

In one example, for a bit array corresponding to bit map index 0, controller 107 determines that the bit array corresponds to two or more sequential LBA address ranges. Controller 107 determines which of the sequential ranges has the longest or greatest length, and then updates the bits of the bit array based on selecting the sequential range having the greatest length. Controller 107 determines the starting physical address for pivot index 0 in order to correspond to the selected sequential range of the bit array being updated. The determined starting physical address is updated in pivot table 701.

Figure 9:
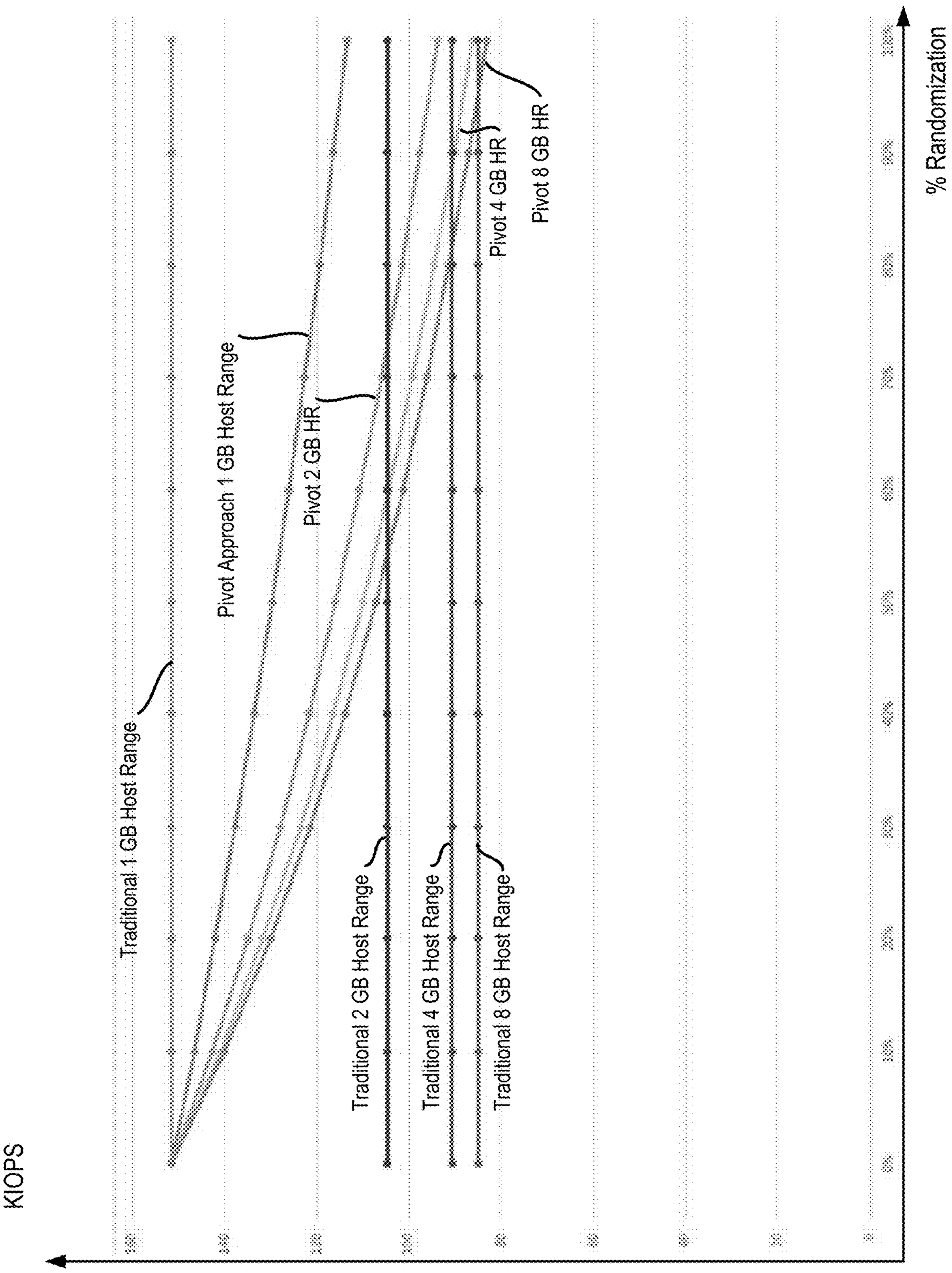
FIG. 9 is a graph illustrating an exemplary thousands of input/output operations per second (KIOPS) on the vertical axis versus percentage of randomization on the horizontal axis in a performance simulation of an exemplary storage device, in accordance with some embodiments.

FIG. 9 is a graph illustrating exemplary kilo-input/output operations per second (KIOPS) on the vertical axis versus percentage of randomization on the horizontal axis for a performance simulation of a storage device, in accordance with some embodiments. In one example, the storage device is a storage device 103 of FIG. 1.

The performance simulation illustrated in FIG. 9 is based on an example in which volatile memory partitioning is based on a total available volatile memory capacity of 1024 KB. The size of the volatile memory (SRAM) is held constant for all simulated configurations in the traditional and pivot approaches. The simulation assumes host ranges of 1 GB, 2 GB, 4 GB, and 8 GB. For example, 8 GB coverage means that the host range spans on 8 GB. In other words, the random read logical addresses given by the host are spread on 8 GB.

The simulation is performed for both a traditional approach and a pivot approach. The pivot approach uses the pivot table and bit map as discussed above. The traditional approach does not use a pivot table or bit map, and instead loads a new chunk into volatile memory whenever needed for handling a new command from the host. The boundary of 150 KIOPS corresponds to the case when the chunk is not loaded (all operations are performed using the loaded chunk). With a 1 MB size of chunk, 1 GB of host range can be covered.

The volatile memory (SRAM) is partitioned into 640 KB for storing a logical-to-physical chunk, which covers a host range of 640 MB. 384 KB of the volatile memory are reserved for a pivot table and a bit map, as discussed above. Considering that a 4 KB pivot table and 16 KB bit map (a total of 20 KB) covers 512 MB by the host, this implies that 384 KB of pivot table and bit map cover (384/20)*512 MB, which is approximately equal to 10 GB.

In a partition of 640 KB+384 KB, and an 8 GB host range (HR), this implies there is a 100% coverage by the pivot table and bit map (whose coverage is ~10 GB, which is >8 GB), and there is a 640/8192 coverage by the chunk.

In case of a 100% sequential write (i.e., no random write), the whole range is covered by the pivot table and bit map, so there is no need to load any chunk, and thus there is no performance drop.

In case of a usage model by the host in which there is a 10% random write and a 90% sequential write, the coverage by the pivot table and bit map is 90% (because the pivot table and bit map cover only the sequential part). In the 10% of cases in which a chunk should be loaded because not covered by the pivot table and bit map, there is still the probability (640/8192) to get a chunk hit in volatile memory (and thus not need to load a new chunk).

As illustrated in FIG. 9, the KIOPS for the pivot approach with 8 GB host range is greater than the KIOPS for the traditional approach with 8 GB host range for most of the percentage randomization cases.

Figure 10:
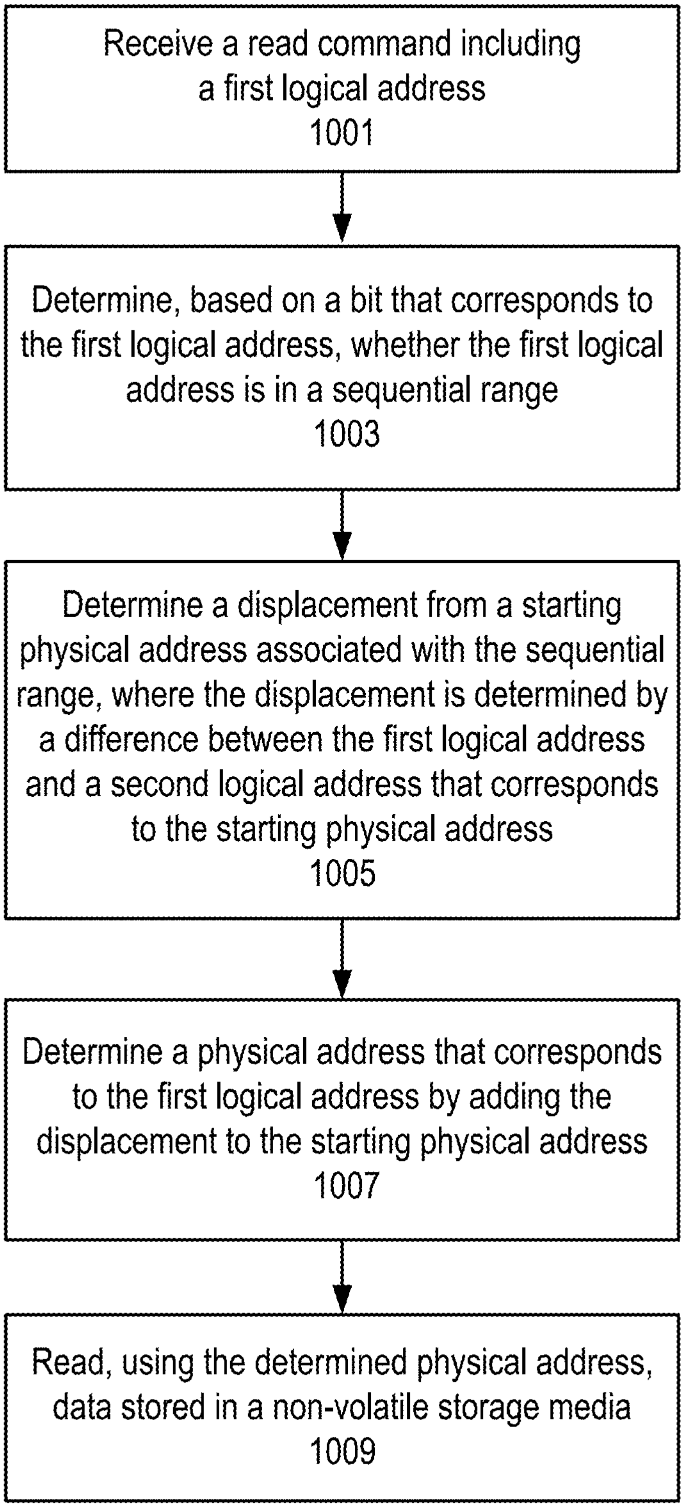
FIG. 10 shows a method for determining a physical address based on a logical address in a command received from a host device by using a pivot table and a bit map, in accordance with some embodiments.

FIG. 10 shows a method for determining a physical address based on a logical address in a command received from a host device by using a pivot table and a bit map, in accordance with some embodiments. For example, the method of FIG. 10 can be implemented in the system of FIG. 1. In one example, the host device is host 101. In one example, the pivot table is pivot table 119, and the bit map is bit map 117.

The method of FIG. 10 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 10 is performed at least in part by one or more processing devices (e.g., controller 107 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1001, a read command including a first logical address is received. In one example, the read command is received by storage device 103 from host 101 and includes an LBA address.

At block 1003, it is determined whether the first logical address is in a sequential range. This determination is based on a bit corresponding to the first logical address. In one example, it is determined that the LBA address is in sequential range 202 of FIG. 2.

At block 1005, a displacement from a starting physical address associated with the sequential range is determined. The displacement is determined by a difference between the first logical address and a second logical address that corresponds to the starting physical address. In one example, the starting physical address is determined using pivot table 701 of FIG. 7. The second logical address is the LBA address that corresponds to the sequential pointer of pivot table 701 that provides the starting physical address. For example, the second logical address for pivot index 1 is LBA 128. For example, the second logical address for pivot index 0 is LBA 0.

At block 1007, a physical address that corresponds to the first logical address is determined by adding the displacement to the starting physical address. In one example, the physical address is determined by controller 107.

At block 1009, data stored in a non-volatile storage media is read using the determined physical address. In one example, stored data 113 is read from non-volatile storage media 109 using the determined physical address.

In one embodiment, a method for a storage device (e.g., storage device 103) comprises: receiving, by a controller (e.g., controller 107), a command including a first logical address for data stored in non-volatile storage media (e.g., non-volatile storage media 109); determining, by the controller based on a first stored value that corresponds to the first logical address, whether the first logical address is in a sequential range (e.g., sequential range 202); and in response to determining that the first logical address is in the sequential range, determining a first physical address that corresponds to the first logical address.

Determining the first physical address comprises: determining a displacement from a starting physical address (e.g., sequential pointer to LBA 0 of pivot index item 0 in table 701) associated with the sequential range, wherein the displacement is determined by a difference between the first logical address and a second logical address (e.g., LBA 0) that corresponds to the starting physical address; and determining the first physical address by adding the displacement to the starting physical address. In one example, as discussed above, for LBA=165 in a received read command, the starting physical address is 1978. The first physical address is equal to 1978+(165−128)=1978+37 (displacement)=2015.

In one embodiment, the command is a read command or a write command.

In one embodiment, the first stored value is one of a plurality of bits stored in a bit map (e.g., bit map 117), and each of the plurality of bits corresponds to a logical address within a host address range.

In one embodiment, each bit of the bit map has a first binary value or a second binary value, the first binary value (e.g., a bit set to high or 1) indicating that the corresponding logical address is in a sequential range, and the second binary value indicating that the corresponding logical address is not in a sequential range.

In one embodiment, the starting physical address is a first starting physical address, and the method further comprises: storing a pivot table (e.g., pivot table 119) comprising a plurality of starting physical addresses including the first starting physical address, wherein each starting physical address corresponds to a respective range of logical addresses. The bit map includes a plurality of bit arrays, each bit array (e.g., an array of bits corresponding to LBA 0 to LBA 127, such as illustrated for bit map index 0 in bit map 801) including a portion of the plurality of bits, and each array corresponding to a respective starting physical address of the pivot table.

In one embodiment, the method further comprises: storing a chunk (e.g., chunk 115) in volatile memory (e.g., volatile memory 106), wherein the chunk provides a logical-to-physical mapping for logical addresses in commands received from a host device, and wherein the chunk includes a plurality of physical addresses, each corresponding to a respective logical address. Each starting physical address of the pivot table corresponds to a respective portion of the chunk.

In one embodiment, the command is received from a host device (e.g., host 101), and the host address range is used by the host device to logically address data stored in the non-volatile storage media.

In one embodiment, the command is a first command received from a host device, and the method further comprises: storing a table (e.g., mapping table 111) in the non-volatile storage media, wherein the table provides a logical-to-physical mapping for logical addresses in commands received from the host device; receiving, from the host device, a second command including a third logical address; determining, based on a second stored value that corresponds to the third logical address, whether the third logical address is in the sequential range; and in response to determining that the third logical address is not in the sequential range, determining a second physical address that corresponds to the third logical address. Determining the second physical address comprises: loading a logical-to-physical chunk from the table into a volatile memory; and determining the second physical address using the loaded chunk.

In one embodiment, the starting physical address is a first starting physical address, and the method further comprises: storing a plurality of starting physical addresses in a table (e.g., pivot table 119), each starting physical address associated with a respective sequential range of logical addresses for data stored in the non-volatile storage media, the starting physical addresses including the first starting physical address.

In one embodiment, a system comprises: non-volatile storage media; volatile memory configured to store a bit map, the bit map including a first bit corresponding to a first logical address; a controller; and firmware (e.g., firmware 104) containing instructions configured to instruct the controller to: receive a command including the first logical address; determine, based on the first bit of the bit map, whether the first logical address is in a sequential range; and in response to determining that the first logical address is in the sequential range, determine a first physical address for the non-volatile storage media that corresponds to the first logical address.

Determining the first physical address comprises: determining a displacement from a starting physical address associated with the sequential range, wherein the displacement is determined by a difference between the first logical address and a second logical address that corresponds to the starting physical address; and determining the first physical address by adding the displacement to the starting physical address.

In one embodiment, the instructions are configured to further instruct the controller to read or write data in the non-volatile storage media using the determined first physical address.

In one embodiment, the starting physical address is a first starting physical address, and the instructions are configured to further instruct the controller to: store a plurality of starting physical addresses in a table, each starting physical address associated with a respective sequential range of logical addresses for data stored in the non-volatile storage media, the starting physical addresses including the first starting physical address. Determining the first physical address further comprises determining the first starting physical address using the table.

In one embodiment, the volatile memory is further configured to store the table.

In one embodiment, the table is a first table, and a second table is stored in the non-volatile storage media, the second table providing a logical-to-physical mapping for logical addresses in commands received from a host device.

In one embodiment, the command is a first command, and the instructions are configured to further instruct the controller to: receive a second command including a third logical address; in response to receiving the second command, load a logical-to-physical chunk from the second table into the volatile memory; and determine, using the loaded chunk, a second physical address that corresponds to the third logical address.

In one embodiment, a non-transitory machine-readable storage medium storing instructions which, when executed on at least one processing device, cause the at least one processing device to at least: receive a read command including a first logical address; determine, based on a bit that corresponds to the first logical address, whether the first logical address is in a sequential range; in response to determining that the first logical address is in the sequential range: determine a displacement from a starting physical address associated with the sequential range, wherein the displacement is determined by a difference between the first logical address and a second logical address that corresponds to the starting physical address; and determine a physical address that corresponds to the first logical address by adding the displacement to the starting physical address; and read, using the determined physical address, data stored in a non-volatile storage media.

In one embodiment, the starting physical address is one of a plurality of starting physical addresses stored in a pivot table in a volatile memory.

In one embodiment, the bit is one of a plurality of bits stored in a bit map in the volatile memory.

In one embodiment, the read command is a first command, the starting physical address is a first starting physical address, and the instructions further cause the at least one processing device to: store a mapping table in the non-volatile storage media, wherein the mapping table provides a logical-to-physical mapping for logical addresses in commands received from a host device; in response to receiving a second command from the host device, load a logical-to-physical chunk from the mapping table into the volatile memory; and in response to loading the chunk, updating a second starting physical address in the pivot table.

In one embodiment, the sequential range is a first sequential range, and the instructions further cause the at least one processing device to: determine a plurality of sequential ranges within a range of logical addresses; determine that the first sequential range has a greatest length of the sequential ranges; and in response to determining that the first sequential range has the greatest length: associate the starting physical address with the first sequential range; and update bits of the bit map that correspond to the first sequential range, wherein each updated bit indicates that a physical address can be determined, based on the displacement from the starting physical address, for a corresponding logical address.

In one example, a performance simulation is performed. For the simulation, the host range is 2 GB. In the simulation, the host sequentially writes 2 GB with a chunk size of 512 KB. This implies that 512K LBA addresses are written to non-volatile memory.

A random write of 50K commands is performed in the same range. Considering 200 MB divided by 2048 MB (2 GB), this implies that 1/10 LBA addresses are random. This implies a randomization of 10%.

In other words, the host writes 2 GB/4 KB=512K LBAs (each host LBA is 4 KB). The host re-writes 50K random write (RW) commands on the same 2 GB. This implies that 200 MB are written by the host. Finally, the file is written for 2 GB: 200 MB as sequential, and 200 MB as random. Thus, the random LBA addresses are 200 MB/2 GB~=10%.

A random read of 50K commands is performed on the same range. The probability to get a random address is 1/10=10%.

With the traditional approach (no pivot table or bit map is used) of having a 1 MB size of chunk in RAM (1 GB coverage), this implies the probability to get a chunk miss is ½=50%.

In contrast, using a pivot approach as described herein having a small size of chunk in RAM, along with a pivot table and bit map stored in the RAM as described above, this implies that less than 10% of received commands will have a chunk miss.

The performance of the simulation for the traditional approach and the pivot approach for random reads on 2 GB are as follows: for the traditional approach, the performance is 104 KIOPS; and for the pivot approach, the performance is 140 KIOPS.

Closing

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
non-volatile storage media;
volatile memory;
a controller; and
firmware containing instructions configured to instruct the controller to:
store a plurality of starting physical addresses in the volatile memory;
store a bit map in the volatile memory, wherein the bit map has a plurality of bits, and each of the bits corresponds to a logical address within a host address range;
receive a command including a first logical address;
determine whether the first logical address is in a sequential range based on a value of a first bit in the bit map, the first bit corresponding to the first logical address; and
in response to determining that the first logical address is in the sequential range, determine a first physical address for the non-volatile storage media that corresponds to the first logical address.

2. The system of claim 1, wherein determining the first physical address further comprises:
determining a displacement from a first starting physical address associated with the sequential range, wherein the displacement is determined by a difference between the first logical address and a second logical address that corresponds to the first starting physical address; and
determining the first physical address by adding the displacement to the first starting physical address.

3. The system of claim 1, wherein the instructions are further configured to instruct the controller to:
store the plurality of starting physical addresses in a table in the volatile memory, each starting physical address associated with a respective sequential physical address associated with a respective sequential range of logical addresses for data stored in the non-volatile storage media;
store a chunk in the volatile memory, wherein the chunk provides a logical-to-physical mapping for logical addresses in commands received from a host device, and wherein the chunk includes a plurality of physical addresses, each corresponding to a respective logical address;
wherein each starting physical address of the table corresponds to a respective portion of the chunk.

4. The system of claim 3, wherein the table is a pivot table.

5. The system of claim 1, wherein the bit map includes a plurality of bit arrays, each bit array including a portion of the plurality of bits, and each array corresponding to a respective starting physical address of the table.

6. The system of claim 1, wherein the command is received from a host device, and the host address range is used by the host device to logically address data stored in the non-volatile storage media.

7. The system of claim 1, wherein the command is a read command or a write command.

8. An apparatus comprising:
a controller; and
firmware containing instructions configured to instruct the controller to:
store a bit map in a volatile memory, the bit map including a plurality of bit arrays, each array corresponding to a respective starting physical address for data stored in a non-volatile storage media;
receive a command including a first logical address;
determine whether the first logical address is in a sequential range based on a value stored in the bit map; and
in response to determining that the first logical address is in a sequential range, determine a first physical address for the non-volatile storage media that corresponds to the first logical address.

9. The apparatus of claim 8, wherein the command is a first command received from a host device, and the instructions are further configured to instruct the controller to:
store a plurality of starting physical addresses in a pivot table, each starting physical address associated with a respective sequential range of logic addresses for data stored in a non-volatile storage media;
store a first table in the non-volatile storage media, wherein the first table provides a logical-to-physical mapping for logical addresses in commands received from the host device;
receive, from the host device, a second command including a second logical address; and
determine, based on a second stored value that corresponds to the second logical address, whether the second logical address is in the sequential range.

10. The apparatus of claim 9, wherein the instructions are further configured to instruct the controller to:
in response to determining that the second logical address is not in the sequential range, determine a second physical address that corresponds to the second logical address, wherein determining the second physical address comprises:
load a logical-to-physical chunk from the first table into a volatile memory; and
determine the second physical address using the loaded chunk.

11. The apparatus of claim 9, wherein the pivot table and the bit map are stored in a volatile memory.

12. A system comprising:
non-volatile storage media;
volatile memory; and
a controller configured to:
store, in the volatile memory, a bit map having a plurality of bits;
receive a read command including a first logical address;
determine whether the first logical address is in a sequential range based on the bit map;
in response to determining that the first logical address is in the sequential range, determine a physical address that corresponds to the first logical address; and
read, using the determined physical address, data stored in the non-volatile storage media.

13. The system of claim 12, wherein a displacement is determined by a difference between the first logical address and a second logical address that corresponds to a starting physical address.

14. The system of claim 13, wherein the starting physical address is one of a plurality of starting physical addresses stored in a pivot table stored in a volatile memory.

15. The system of claim 13, wherein the read command is a first command, the starting physical address is a first starting physical address, and the controller is further configured to:

store a mapping table in the non-volatile storage media, wherein the mapping table provides a logical-to-physical mapping for logical addresses in commands received from a host device;

in response to receiving a second command from the host device, load a logical-to-physical chunk from the mapping table into the volatile memory; and in response to loading the chunk, update a second starting physical address in the pivot table.

16. The system of claim 12, wherein the sequential range is a first sequential range, and the controller is further configured to:

determine a plurality of sequential ranges within a range of logical addresses; and determine that the first sequential range has a greatest length of the sequential ranges.

17. The system of claim 16, wherein the controller is further configured to, in response to determining that the first sequential range has the greatest length:

associate the starting physical address with the first sequential range; and update bits of a bit map that correspond to the first sequential range;

wherein each updated bit indicates that a physical address can be determined, based on the displacement from the starting physical address, for a corresponding logical address.

18. A method comprising:

storing a plurality of starting physical addresses in a volatile memory, each starting physical address associated with a respective sequential range of logical addresses for data stored in a non-volatile storage media, the starting physical addresses including a first starting physical address;

storing a bit map in the volatile memory, the bit map having a plurality of bits;

receiving a command including a first logical address;

determining whether the first logical address is in a sequential range based on a value of a first bit of the plurality of bits, the first bit corresponding to the first logical address; and in response to determining that the first logical address is in the sequential range, determining a first physical address for the non-volatile storage media that corresponds to the first logical address, wherein the first physical address is determined using the first starting physical address.

19. The method of claim 18, further comprising reading or writing data in the non-volatile storage media using the determined first physical address.

20. The method of claim 18, further comprising storing a table in the non-volatile storage media, the table providing a logical-to-physical mapping for logical addresses in commands received from a host device.

21. The method of claim 20, wherein the command is a first command, the method further comprising:

receiving a second command including a second logical address;

in response to receiving the second command, loading a logical-to-physical chunk from the table into the volatile memory; and determining, using the loaded chunk, a second physical address that corresponds to the second logical address.

* * * * *